United States Patent Office 2,937,945

Patented May 24, 1960

2,937,945

PROCESS AND PHOTOGRAPHIC MATERIAL FOR THE DIRECT PRODUCTION OF POSITIVE PHOTOGRAPHIC IMAGES

Edith Weyde, Leverkusen-Kuppersteg, and Heinz Berger, Leverkusen-Bayerwerk, Germany, assignors to Agfa Aktiengesellschaft No Drawing. Filed Sept. 14, 1954, Ser. No. 456,069

Claims priority, application Germany Sept. 16, 1953

6 Claims. (Cl. 96—29)

This invention relates to a process for the direct production of positive photographic images and to photographic material used for such a process. The invention is an improvement in the invention described in copending application Serial No. 109,073, filed August 6, 1949, by Edith Weyde and which has now issued as Patent Number 2,712,995.

In the above-mentioned patent there is described a process for the direct production of positive photographic images. This process comprises exposing to the object to be reproduced a light sensitive material comprising two light sensitive silver salts such as silver bromide and silver chloride, one of which—such as silver bromide—has a higher light sensitivity than the other, the amount of the higher light sensitive salt being from 0.1 to 10% by weight of the lower light sensitive salt, whereby only the higher light sensitive salt is affected by the exposing light, whereafter the exposed material is developed in a developer by which the affected higher light sensitive silver salt is developed to a weak negative image and the lower light sensitive silver salt is developed only at the unaffected areas of the material to give a conspicuous positive image, the developer containing no salts—such as potassium bromide—whose anions are the same as those of the higher light sensitive salt or containing such salts in such a small concentration that the development of the lower light sensitive silver salt is not inhibited. The material used for carrying out this process may either contain the two differently sensitive emulsions in mixed form in a single layer or each emulsion in a different layer which layers are in contact with each other, one for instance being a silver bromide emulsion layer and the other a silver chloride emulsion. The reduction of the low light sensitive silver salt emulsion layer in the above process may be accelerated by adding development nuclei such as colloidal noble metals or difficultly soluble compounds of noble metals. During the development process anions of the higher light sensitive silver salt such as bromine ions are set free, which prevent the lower light sensitive silver salt such as silver chloride in the immediate vicinity of the exposed areas from being developed.

The silver images obtained by this process show the drawback, that the whites are impaired to some degree by the weak negative image formed from the higher light sensitive emulsion. It is therefore necessary to be especially careful to keep the amount of this silver salt emulsion as small as possible, so that the fogging originating from the negative does not become too great.

It has now been found that it is possible to obviate these disadvantages and to improve the quality of these images if the differently sensitive silver halide salt emulsions are arranged in different layers, these layers being kept in contact, at least during the development, but being separated from one another again in the final image.

It is possible to conceive of many possible ways for carrying this process into effect, and some of the important possibilities are hereinafter explained.

A hardened silver chloride emulsion, to which some colloidal silver is added as development nuclei, is coated with a thin layer of a silver bromide emulsion. This silver bromide layer may be removed during or after the processing. In order to achieve this effect, it is possible to use all means which are common in the production of stripping layers. When using for instance a silver chloride emulsion hardened with formalin and an unhardened silver bromide emulsion, the latter is capable of being easily removed after processing in warm water.

Since only very small amounts of silver bromide emulsion are required, it is possible for a silver bromide emulsion prepared in the conventional manner with gelatine as binder to be diluted with a coating agent which is soluble in or can be dissolved off by water and then for this mixture to be coated on the silver chloride emulsion layer. Particularly suitable coating agents of this type are those substances which have only a comparatively slight bonding capacity with the underneath layer, the bonding capacity depending on the binder of the first layer and also of the second layer. It is therefore possible for the composition of the binder to be greatly varied for both emulsion layers. As binding agents, it is possible to apply all substances which have previously been used for the manufacture of light-sensitive layers. The following are mentioned by way of example: gelatine, synthetic binding agents, for example, polyvinyl alcohol, hydrophilic cellulose derivatives, starch ether. Since the layers according to the present invention are only developed for a very short time and the developer contains considerable amounts of salts which strongly inhibit the swelling of the binders, such as, for example, that of polyvinyl alcohol, the outer layers are usually only detached from the silver chloride-gelatine layer in the wash water.

It has occasionally proved to be very advantageous for small amounts of silver bromide emulsion to be added to the silver chloride emulsion and for the major part of the silver bromide emulsion to be cast on as a second layer. In certain cases, it is also possible for small amounts of silver chloride emulsion to be added to the silver bromide emulsion. For carrying the process into effect, it is not absolutely necessary for the two layers to be cast one above the other, but the silver chloride emulsion and the silver bromide emulsion may be cast on to different supports and the two layers only brought into contact during processing. In this respect also, it is possible to use various forms of the invention. For example, both layers may be held in contact during the development, or the two layers may first of all be briefly wetted with a developer free from bromine ions and then brought into contact with one another.

The exposed parts of the silver bromide emulsion layer, which produce a negative on development, thus form bromine ions which diffuse over into the silver chloride layer and prevent the development in the silver chloride emulsion layer, while the silver chloride layer is rapidly reduced to silver at the places free from bromine ions. After development, the layers must be fixed in the usual manner. If desired, the silver bromide layer may be quite briefly developed or there may be used almost completely developed layers before they are brought in contact with the silver chloride layer.

One particular advantage of the process using separate layers is that it is possible to use somewhat larger amounts of silver bromide emulsion.

*Example*

To a silver chloride emulsion, the binding agent of which consists of gelatine, there are added per litre 0.01 g. of colloidal silver and 1.2 g. of formalin. This emulsion is coated on a transparent or non-transparent support in such a thinness, that the layer produced from this emulsion contains 0.8–1.2 g. of silver per m.$^2$. On this layer there is coated a silver bromide emulsion which is obtained from an ordinary silver bromide-gelatine-emulsion by adding to 50 ccm. of such an emulsion 1 litre of an aqueous solution containing 4 g. per litre of polyvinyl-alcohol. This latter emulsion has a higher light sensitivity than the aforementioned silver chloride emulsion. The silver bromide emulsion layer produced in this manner contains 0.01–0.1 g. of silver per m.$^2$. This two-layer material is exposed to the object to be reproduced, whereby only the silver bromide emulsion layer is affected. Thereafter the layers are developed in a solution of the following composition:

| | | |
|---|---|---|
| Water | ccm | 1000 |
| p-Methylaminophenol-sulfate | g | 1.5 |
| Hydroquinone | g | 6 |
| Sodium sulfite (anhydrous) | g | 80 |
| Sodium carbonate | g | 30 |

There is obtained a negative image in the silver bromide emulsion layer and a positive image in the silver chloride emulsion layer. The layers are treated with a dilute solution of acetic acid in order to interrupt the development, thereafter fixed and washed. Finally the outer layer is removed by treating the processed material with warm water so that only the layer remains which contains the positive image.

We claim:

1. A process for producing photographic images which comprises forming a first silver salt emulsion layer of relatively high light sensitivity and a second silver salt emulsion layer of relatively low light sensitivity but developable without the presence of a latent image, said layers being distinct and separable from each other, and the silver salt of the first layer being a halide, subjecting said first layer to an exposure to the image to be reproduced to form a latent image in this layer, contacting each of said layers with a developer solution that develops only the latent image of the first layer and is capable of reducing the silver salt of said second layer without prior exposure, said developer solution being an ordinary silver salt developing solution containing as solvent an agent which has a higher dissolving power for the silver salt in the second emulsion than the silver salt in the first emulsion, and containing salts having the same anions as the silver salts of the first layer at most in such quantity that the development of the silver salt in the second layer is not prevented until the developing solution forms an extremely faint negative image in the first layer, holding said layers in face-to-face contact during contact with said developer solution to form a negative silver image in said first layer and cause migration of dissolved anions from the silver halide thus developed to the adjacent areas of said second layer, the relative silver compound concentration in the layers being such that this migration limits the silver salt reduction by the developer solution in the second layer to non-adjacent areas, thereby forming a conspicuous positive silver image in said second layer, and thereafter separating said first and second layers.

2. The process of claim 1 wherein the silver salt in the emulsion of relatively high light sensitivity is essentially silver bromide, the silver salt in the emulsion of relatively low sensitivity is essentially silver chloride and wherein said developer solution is substantially free of bromide anions.

3. A photographic material comprising a support carrying a first silver salt emulsion layer of relatively low light sensitivity and an overlying second silver salt emulsion layer of relatively high light sensitivity, said second layer being a silver halide layer developable after it is exposed to form a latent image, and said first layer being capable of development without a latent image in the same developer that develops the second layer, the silver salt in said second layer is present in an amount between 0.10–10% by weight of the silver salt in said first layer, and said second layer being loosely bonded to the first layer so that the layers are easily separable from each other after development.

4. The combination of claim 3 in which the second layer is an emulsion in a binding agent that is softened by contact with the developer, and the other layer is an emulsion in a binding agent that is not so softened.

5. The process of claim 1 wherein the starting layers are held on a single support, the second layer being coated directly on the support and the first layer being coated on the second layer.

6. The process of claim 1 wherein the starting layers are held in separate supports.

References Cited in the file of this patent

UNITED STATES PATENTS

| | | |
|---|---|---|
| 1,846,230 | Stuber | Feb. 23, 1932 |
| 2,036,369 | Simjian | Apr. 7, 1936 |
| 2,373,732 | Wolfson | Apr. 17, 1945 |
| 2,500,421 | Land | Mar. 14, 1950 |
| 2,565,376 | Land | Aug. 21, 1951 |
| 2,588,982 | Ives | Mar. 11, 1952 |
| 2,665,986 | Rott | Jan. 12, 1954 |
| 2,673,800 | Meeussen et al. | Mar. 30, 1954 |

OTHER REFERENCES

Ricketts: The British Journal of Photography, June 5, 1914, page 446.